United States Patent [19]

Suyama

[11] Patent Number: 4,552,016
[45] Date of Patent: Nov. 12, 1985

[54] SENSOR FOR CURRENTMETER
[75] Inventor: Satoshi Suyama, Hatano, Japan
[73] Assignee: The Tsurumi-Seiko Co., Ltd., Yokohama, Japan
[21] Appl. No.: 522,251
[22] Filed: Aug. 9, 1983
[30] Foreign Application Priority Data Aug. 18, 1982 [JP] Japan ................................ 57-142189

[51] Int. Cl.$^4$ .......................... G01P 5/00; G01F 1/66
[52] U.S. Cl. .................................. 73/170 A; 73/189; 73/861.28
[58] Field of Search ................ 73/170 A, 189, 181, 73/861.29, 861.27, 861.28

[56] References Cited
U.S. PATENT DOCUMENTS 3,546,935 12/1970 Bruha ............................... 73/861.31
4,094,193 6/1978 Gerlach ........................... 73/170 A
4,391,136 7/1983 Perkins et al. ................ 73/861.27 X

FOREIGN PATENT DOCUMENTS 607462 12/1978 U.S.S.R. ............................ 73/170 A

Primary Examiner—Charles A. Ruehl
Assistant Examiner—Brian R. Tumm
Attorney, Agent, or Firm—Wenderoth, Lind & Ponack

[57] ABSTRACT

A sensor for a currentmeter includes a supporting member which is provided to support a pair of transmitter/receiver units which rotate around an axis that is not parallel to (i.e.–intersects) a transmission path of supersonic waves which propagate between the units. Sing-around signals which are transmitted correspond to each rotating position of the supporting member. Since only one pair of transmitter/receiver units is required, current turbulence caused by the supporting member is reduced so that a highly precise measurement of the current flowing between the pair of transmitter/receiver units may be obtained.

7 Claims, 10 Drawing Figures (A) β=0°

(B)
β=15°

(C)
β=30°

(D)
β=45°

(E)
β=60°

(F)
β=75°

(G)
β=90°

4,552,016

SENSOR FOR CURRENTMETER

BACKGROUND OF THE INVENTION

The present invention relates to a sensor for currentmeters.

In case of measuring the rate and direction of water flow along shores, rivers and lakes, it is generally necessary to perform a three-dimensional detection. In prior art systems, a sensor is mounted with plural pairs of supersonic transmitter/receiver units which are positioned at predetermined intervals and which operate in the so-called sing-around fashion. As a result, the equipment becomes complicated in structure and bulky in size due to the large number of transmitter/receiver pairs. It is not only costly but also produces poor precision in its measurement since turbulence is liable to occur because of struts supporting the transmetter/receiver pairs.

SUMMARY OF THE INVENTION

The present invention is directed to the above mentioned situation and aims at providing a sensor for a currentmeter which only needs one pair of transmitter/receiver units and which can detect a current at a higher precision by eliminating the influence of turbulence caused by support struts.

According to the present invention a supporting member is provided to support a pair of transmitter/receiver units which rotate around an axis that is not parallel to a transmission path of supersonic waves which propagate between the units. Sing-around signals which are transmitted correspond to each rotating position of the supporting member. Since only one pair of transmitter/receiver units is required, a range where turbulence is caused due to the supporting member is extremely restricted, so that highly precise signals corresponding to the rest of the wide range are not influenced by support member induced turbulence. In short, highly precise measurement data can be obtained by eliminating the signals which correspond to the above mentioned small range.

BRIEF DESCRIPTION OF THE DRAWINGS

The drawings show an embodiment according to the present invention in which.

DESCRIPTION OF THE PREFERRED EMBODIMENT

Figure 1:
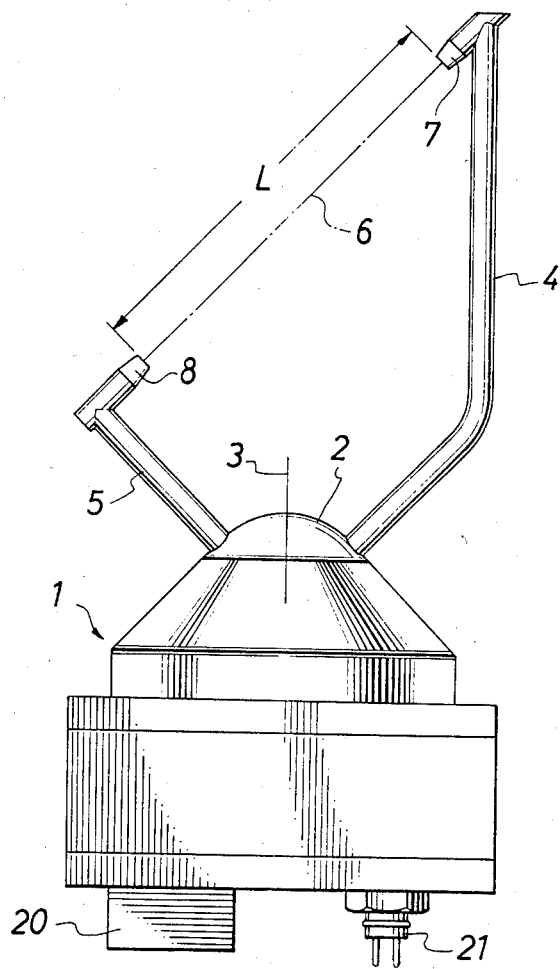
FIG. 1 is a front view thereof.

As shown in FIG. 1, a supporting member 2 is mounted rotatably around an axis 3 of a main body 1 which is formed so as to be fluid tight. The supporting member 2 is provided with a pair of struts 4 and 5; one strut is long and the other strut is short. A supersonic wave transmitter and receiver are respectively mounted at the tips of the struts 4 and 5 to oppose each other and are separated by a supersonic wave transmission path 6 which is not parallel to said axis 3 and which has a predetermined length L.

Figure 2:
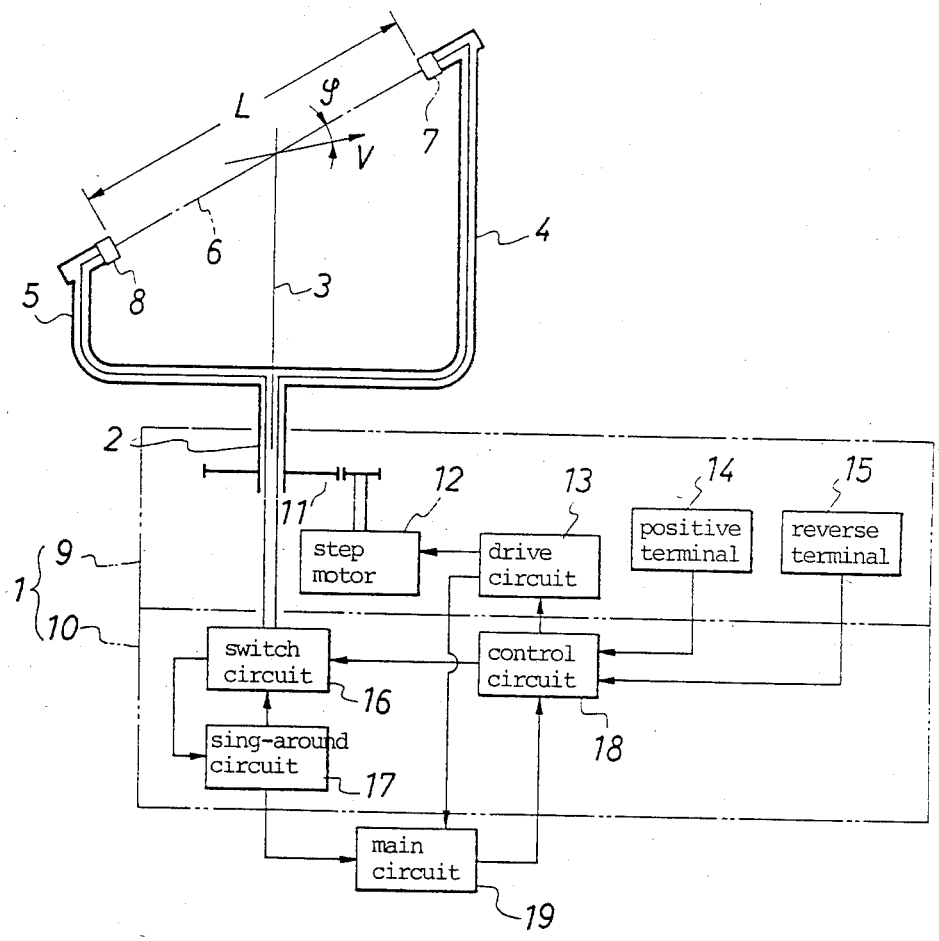
FIG. 2 is a block diagram of the embodiment of FIG. 1.

As schematically shown in FIG. 2, said main body 1 is provided with a pressure equalizing section 9 having an insulating oil sealed therein and a pressure resistant section 10 having air sealed therein. Inside the pressure equalizing section 9 is provided a step motor 12 which drives the supporting member 2 via a gear mechanism 11; a drive circuit 13 which supplies controlling power to the step motor 12 and terminal sensor members 14 and 15 for both the positive and reverse directions are provided. Inside the pressure resistant section 10 a switch circuit 16 for the pair of transmitter/receiver units 7 and 8, and a sing-around circuit 17 which includes a transmission section and a receiving section are provided. A control circuit 18 which transmits control signals to the drive circuit 13 and the switch circuit 16 respectively and which receives the detected signals from the terminal sensor members 14 and 15 are also provided. The drive circuit 13, the sing-around circuit 17 and the control circuit 18 are installed outside the main body 1 and are connected to a main circuit 19 which has a suitable memory member, an arithmetic unit, a display and a microprocesor.

In FIG. 1, reference numeral 20 denotes a pressure compensation member provided with bellows which are communicated with the pressure equalizing section 9 and which expands or contracts according to fluctuations of the inside pressure. The reference numeral 21 denotes a pressure resistant connector which is used to connect the main body 1 to the main circuit 19.

The operation of the device of the aforementioned structure will now be described. The step motor 12 is driven by a command signal sent from the main circuit 19 via the control circuit 18, when the drive circuit 13 outputs control power. The supporting member 2 is intermittently driven by the gear mechanism 11 so as to rotate in a desired direction by a desired angle. When the supporting member 2 is rotated in the positive direction by a desired angle from the starting position (for example, an angle which slightly exceeds 360 degrees), the output signal of the terminal sensor member for the positive direction 14 is fed to the control circuit 18 and the phase of the control power from the drive circuit 13 is inverted. That is to say, the step motor 12 and consequently the supporting member 2 are driven so as to rotate in the reverse direction after a predetermined period of time. When the supporting member 2 is rotated in the reverse direction by a desired angle (for example, an angle which slightly passes the above-noted starting position in the reverse direction), the output signal for the terminal sensor member of the reverse direction 15 is fed to the control circuit 18 and the supporting member 2, after an appropriate period of time is driven once again so as to rotate in the positive direction. If the supporting member 2 is driven so as to rotate as noted above, the main circuit 19 receives the signal from the drive circuit 13 which corresponds to the number of transmitted control power pulses; i.e., the signal representing an angle which corresponds to the rotational angle of the supporting member 2 with respect to the starting position.

The switch circuit 16, on the other hand, is so constructed that the transmitter receiver units 7 and 8 are alternately connected to the transmitting section and the receiving section respectively according to the control signals from the control circuit 18. If the transmitter receiver unit 7 is connected to the transmitting section and transmitter/receiver unit 8 is connected to the receiving section when the supporting member 2 is stopped at the starting position, the pulse signal repeatingly circulates as follows; the transmitter/receiver unit 7 →transmission path 6 → transmitter/receiver unit 8 → receiving member → transmitting member → the transmitter/receiver unit 7. Its repeated frequency fa is transmitted from the sing-around circuit 17 to the main circuit 19. When approximately ½ of the stopped time at the above-noted starting position has passed, the transmitter/receiver unit 7 is switched and connected to the receiving section and the unit 8 is connected to the transmitting section by a control signal from the control circuit 18 and the pulse signal is repeatedly circulated in the reverse direction from the above-noted, while at the same time, its repeated frequency fb is transmitted to the main circuit 19. When the stopped time at the above mentioned starting position has passed, the supporting member 2 is rotated by a desired angle and stops at the second stop position. The switching operation of the switch circuit 16 is conducted during this time and the transmitter/receiver unit 7 is connected to the transmitting section and the unit 8 is connected to the receiving section. The sing-around control of the transmitter/receiver 7 and 8 at each stop position is performed in exactly the same manner as above.

In order to simplify the explanation, it is presumed that the axis of the rotation 3 of the supporting member 2 is on the same plane as the supersonic transmission passage 6 as shown in FIG. 2. In case this plane is at a standstill at a position which includes the fluid flow vector of fluid, the difference between the above-noted repeated frequencies f (=fb−fa), as is already known, is represented as:

$$f = (2/L) V \cos \phi \quad (1)$$

wherein V is the rate of the flow and $\phi$ is the angular displacement of the direction of the flow with respect to the transmission path 6 (as shown in FIG. 2).

Figure 3:
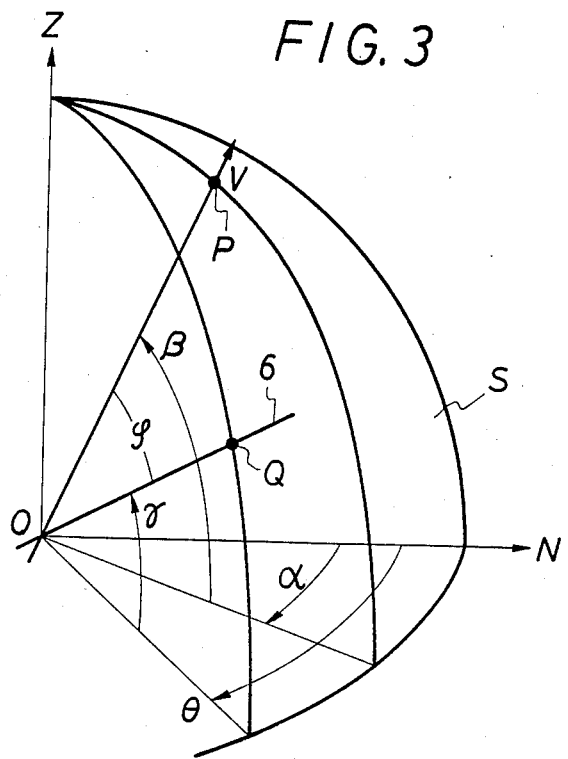
FIG. 3 is a drawing used to explain the principles of operation of the present invention.
Figure 4:
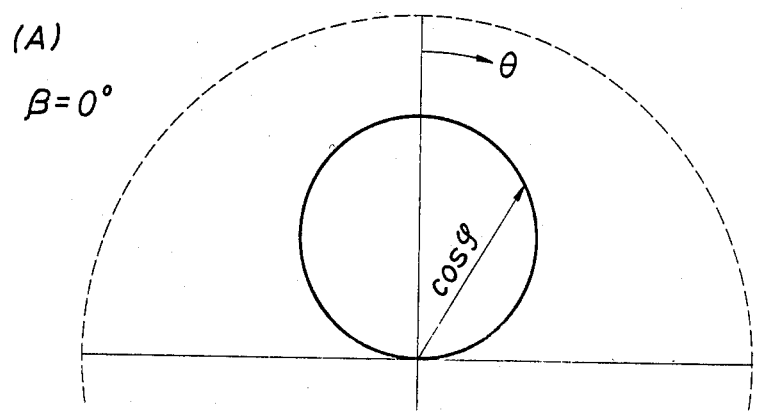
FIGS. 4(A) through (G) are diagrams which show the output patterns thereof.
Figure 4:
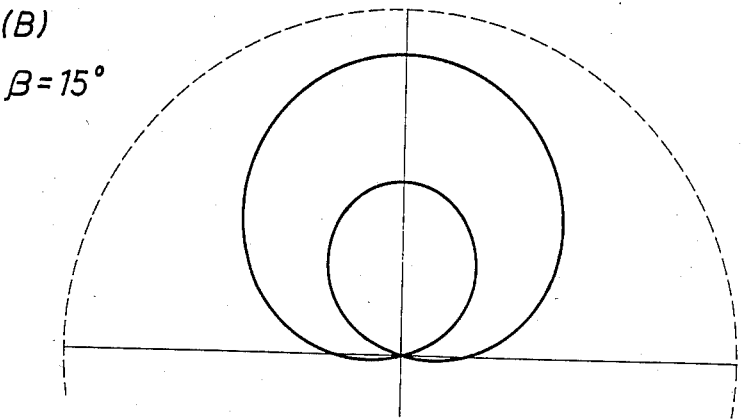
Figure 4:
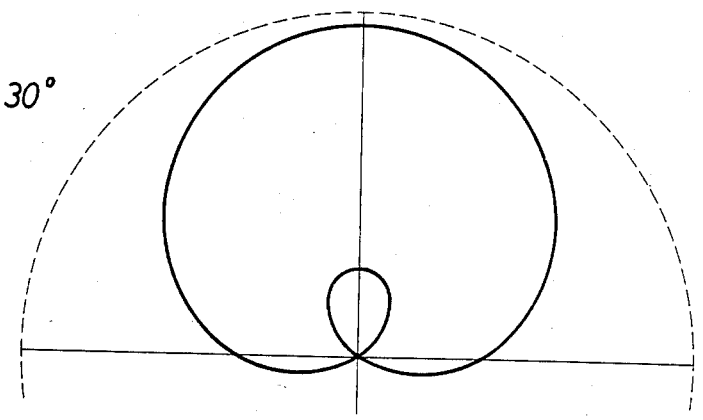
Figure 4:
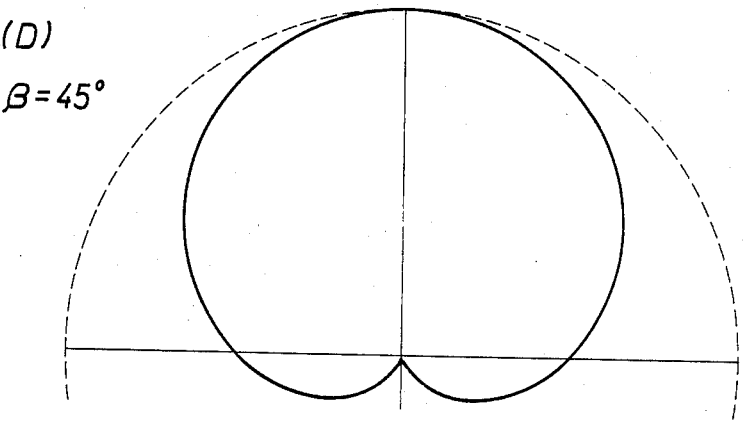
Figure 4:
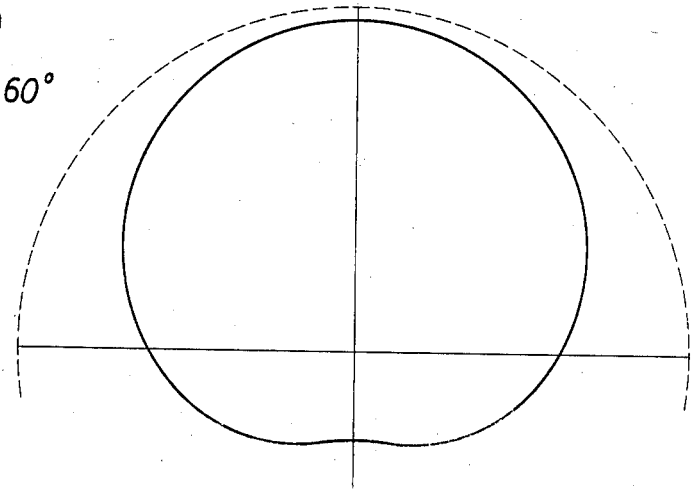
Figure 4:
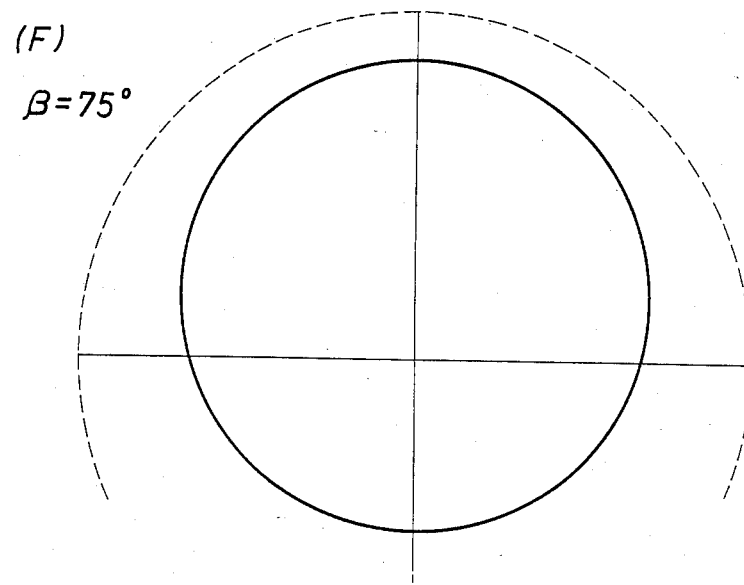
Figure 4:
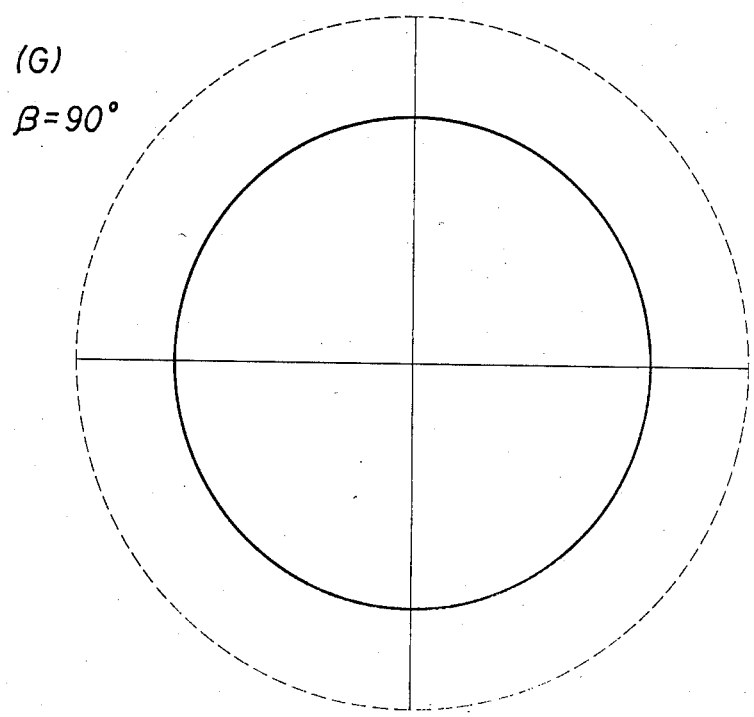

It is now assumed that the rotational axis 3 of the supporting member 2 coincides with a perpendicular axis z as shown in FIG. 3 and that there is a sphere S with its center O on the axis z and its radius equal to 1. The point P where the fluid vector V passing the center O crosses the sphere S is at the $\alpha$ directional angle from the reference direction N and at the $\beta$ angle of elevation from the horizontal level. The point Q where the transmission passage 6 passing the center O crosses the sphere S is at the $\theta$ rotational angle from the reference direction N and is at the angle of elevation from the horizontal level. According to the formula to obtain the length $\phi \cdot 1$ along the great circle arc between the two points P, Q, the angular displacement $\phi$ is known to have the following relationship:

$$\cos \phi = \sin \beta \sin \gamma + \cos \beta \cos \gamma \cos (\theta - \alpha) \quad (2)$$

The cos $\phi$ value thus obtained is proportional to the projection of the fluid vector V with respect to the transmission passage 6 at various rotational angles $\theta$ of the supporting member 2. FIGS. 4(A)–(G) show the relationship between $\theta$ and cos $\phi$ in polar coordinates when $\alpha=0$, $\gamma=45°$. FIGS. 4(A) through (G) indicate the cases where the value of $\beta$ is increased discretely by 15° and the broken line in each drawing shows the reference circle with the radius of 1. It is unnecessary to explain that similar diagrams may be displayed by other appropriate display means such as a CRT which is connected to the main circuit 19.

As mentioned above, it is possible to obtain the frequency difference f . . . corresponding respectively to various rotational angles $\theta$ . . . by driving the supporting member 2 so as to cause rotation. It is therefore possible to obtain the rate v, the directional angle $\alpha$ and the elevation angle $\beta$ by storing these data $\theta$ . . . , f . . . in the main circuit 19 and by suitably processing the contents of the memory. For example, as is obvious from the formula (2) and FIG. 3, $\phi$ is at its minimum when $\phi=\beta-\gamma$ and $\theta=\alpha$ and is at its maximum when $\phi=\beta+\gamma$ and $\theta=\alpha+\pi$. Therefore, it is possible to obtain the directional angle $\alpha$ of the vector v from the rotational angle $\theta$ when the frequency difference f becomes either maximum or minimum. If it is assumed that the angular displacement is $\phi$, and the frequency difference is $f_1$ when $\theta=\alpha$, and if it is assumed that the angular displacement is $\phi_2$, and the frequency difference $f_2$ when $\theta=\alpha+x/2$, then the following relationships hold;

$$f_1 = (2/L) v \cos \phi_1 \quad (3)$$

$$\cos \phi_1 = \sin \beta \sin \gamma + \cos \beta \cos \gamma \quad (4)$$

$$f_2 = (2/L) v \cos \phi_2 \quad (5)$$

$$\cos \phi_2 = \sin \beta \sin \gamma \quad (6)$$

$$\therefore f_1/f_2 = 1 + \cot \beta \cot \gamma \quad (7)$$

It is therefore possible to obtain the angle of elevation $\beta$ of the vector v from the established $\gamma$ and the measured $f_1$ and $f_2$, and since the length of the passage L is known, the fluid rate v can be obtained from the formulae (5) and (6).

According to the above construction, since the pair of transmitter/receiver units 7 and 8 are under the sing-around control, the measured fluid rate is not affected by the fluctuation in sonic speed, which automatically eliminates errors caused by the temperature, fluid density, and components of the fluid and therefore constant precise measurements are possible. In addition, since the supporting member 2 is driven by a step motor 12, the rotational angle $\theta$ can be detected by measuring the number of input pulses to the motor and it is not necessary to install a separate means to detect the rotational angle. Furthermore, since the rotational angle of the supporting member 2 is set within a range which is only slightly larger than 360 degrees, it is possible to connect the pair of transmitter/receiver units 7 and 8 and the switch circuit 16 by a flexible conductor, thereby making the connecting section more secure. Unlike the case of a slidable contact, the errors in measurement due the fluctuation in the contact resistance is effectively prevented while its durability is improved and its maintenance simplified. Since the supersonic transmission path 6 is made to rotate around the axis 3 which is not parallel to the passage, the three-dimensional measurement of the fluid vector v can be conducted. It is not necessary to constantly provide a detecting means for a directional angle $\alpha$ and an inclined angle $\beta$ if they are accurately programmed at the initial stage. Since it is also possible to detect plural combinations of the rotational angle of the supporting member 2 and corresponding frequency differences, highly precise calculations can be conducted by eliminating inaccurate data affected by the turbulence caused by struts 4 and 5. The fact that the number of the struts is limited to only two contributes to the precise operation.

The application of the present invention is not restricted to the above mentioned embodiment. For example, the range of rotation of the supporting member 2 may be narrower than 360° and it may be rotated in one direction only instead of the reciprocal rotation indicated above. Other appropriate means may be provided instead of a step motor for driving and in such a case, a suitable means for detecting rotational angle must be installed. In other words, a suitable detecting means for direction and for angle may be mounted on the main body 1. Various other alterations and modification are possible within the scope of the principle of the present invention.

I claim:

1. A sensor for a currentmeter comprising a pair of supersonic transmitter/receiver units which are arranged in fluid so as to face each other at a predetermined distance, a path therebetween forming a supersonic transmission path, wherein said pair of units are controlled by a sing-around control method and wherein a supporting member is provided to support said pair of transmitter/receiver units and to rotate said pair of units around an axis which intersects said supersonic transmission path, and wherein sing-around signals are output which correspond to an angular position of said supporting member.

2. A sensor for a currentmeter as claimed in claim 1, wherein said supporting member is rotated by a step motor which is connected to a drive circuit and which is rotated in response to output pulses from said drive circuit.

3. A sensor for a currentmeter as claimed in claim 2, wherein said output pulses of said drive circuit which are used to rotate said step motor are also used to detect said angular position of said supporting member.

4. A sensor for a currentmeter of the type having a pair of supersonic transmitter/receiver units which are arranged so as to face each other at a predetermined distance, a path therebetween forming a supersonic transmission path, wherein said pair of units are controlled by a sing-around control method and wherein struts are provided for supporting said pair of transmitter/receiver units and a rotating means is provided for rotating said struts around an axis which intersects said transmission path and for stopping said struts at a few predetermined positions; a sing-around circuit is provided for transmitting supersonic waves between said pair of transmitter/receiver units while said struts are at said predetermined stopped positions and for detecting said supersonic waves and for transmitting said detected waves to a main circuit, and wherein an angle detecting means is provided for detecting a rotating angle of said struts and for outputting said detected angle to the main circuit.

5. A sensor for a currentmeter as claimed in claim 4, wherein said rotating means comprises a drive circuit for generating output pulses and a step motor which is connected to said drive circuit and which is rotated in response to said output pulses.

6. A sensor for a currentmeter as claimed in claim 5, wherein said angle detecting means includes a means for counting said output pulses from said drive circuit.

7. A currentmeter comprising a pair of transmitter/receiver units which are arranged in fluid so as to face each other, a switch circuit which switches between transmission and receiving by alternately setting one of said transmitter/receiver units as a means for transmitting and the other of said units as a means for receiving, struts which support said transmitter/receiver units, a rotating means for rotating said struts around an axis which intersects a supersonic transmission path between said pair of units, said rotating means rotating said struts from a starting position to a few predetermined stopped positions and then again starts rotating said struts, a sing-around circuit which, at said starting position and at said predetermined stopped positions, continuously transmits supersonic waves from the transmitting unit to the receiving unit in a manner such that the receiving unit transmits said waves as soon as it receives them and switches by means of said switch circuit the transmission by one of said units to the receiving by said unit so that said sing-around circuit detects the repeated frequencies of said waves transmitted between said two units, a detecting means for detecting a rotating angle of said struts and a main circuit which receives as inputs said wae frequencies measured by said sing-around circuit and the rotational angles detected by said detecting means and which calculates the flow rate and the flow direction of fluid in response thereto.

* * * * *